March 16, 1954 W. H. T. HOLDEN ET AL 2,672,518

STATION IDENTIFIER

Filed May 28, 1949 6 Sheets-Sheet 1

| | | |
|---|---|---|
| FIG. 1 | FIG. 2 | FIG. 3 |
| FIG. 4 | FIG. 5 | FIG. 6 |

INVENTORS W. H. T. HOLDEN
E. L. VIBBARD
BY [signature]
ATTORNEY

INVENTORS W. H. T. HOLDEN
E. L. VIBBARD
BY [signature]
ATTORNEY

INVENTORS W.H.T. HOLDEN
E.L. VIBBARD
BY
ATTORNEY

INVENTORS W.H.T. HOLDEN
E.L. VIBBARD
BY [signature]
ATTORNEY

STATION IDENTIFIER

Filed May 28, 1949 6 Sheets-Sheet 5

INVENTORS W.H.T. HOLDEN
E.L. VIBBARD
BY
ATTORNEY

March 16, 1954 W. H. T. HOLDEN ET AL 2,672,518

STATION IDENTIFIER

Filed May 28, 1949 6 Sheets-Sheet 6

INVENTORS W. H. T. HOLDEN
E. L. VIBBARD
BY
ATTORNEY

Patented Mar. 16, 1954

2,672,518

UNITED STATES PATENT OFFICE 2,672,518

STATION IDENTIFIER

William H. T. Holden, Woodside, and Edward L. Vibbard, Jackson Heights, N. Y., assignors to Bell Telephone Laboratories, Incorporated, New York, N. Y., a corporation of New York Application May 28, 1949, Serial No. 96,054

14 Claims. (Cl. 179—18)

This invention relates to identifiers for the stations of telephone and similar systems.

In telephone systems, each subscriber's station is usually assigned a directory number which identifies the particular station. These numbers usually each consist of four digits, running from 0000 to and including 9999, but the numbers are duplicated in the various central offices of the system. Usually there are one or two stations on each telephone line. Private branch exchanges, however, often have stations to which no directory numbers are assigned and, generally, the stations of a private branch exchange are not individually identified by directory numbers, but are all associated with one directory number assigned to the private branch exchange as a whole.

It is frequently necessary, in the handling of telephone traffic, to determine the directory number of a station in response to a signal from said station, or to determine the directory number of a private branch exchange in response to a signal from any one of the stations of said private branch exchange. The present invention discloses a novel system for expeditiously performing these operations.

Features of this invention include means for determining directory numbers of stations by frequencies representing digits of said numbers and frequencies indicating the digital positions of said digits; means for checking the correctness of the indications of directory numbers so determined; and means for simultaneously determining the directory numbers of all the stations on a line and checking and registering only the number of a particular one of said stations.

These and other features of the invention will be more readily apparent from the accompanying description, the appended claims, and the drawing, in which:

In general, the invention comprises means for applying to the line of a calling station successive combinations of frequencies, each combination being composed of frequencies representing one of the digits of the directory number or numbers of stations on said line and a frequency indicative of the digital position in the directory numbers of the digits represented, and means which are selectively responsive to the various combinations to register each digit in its proper digital position. Means are also provided for checking the correctness of the indications from which the registration of the directory number is made before registering the number, and for registering only the directory number of the station calling.

Figure 4:
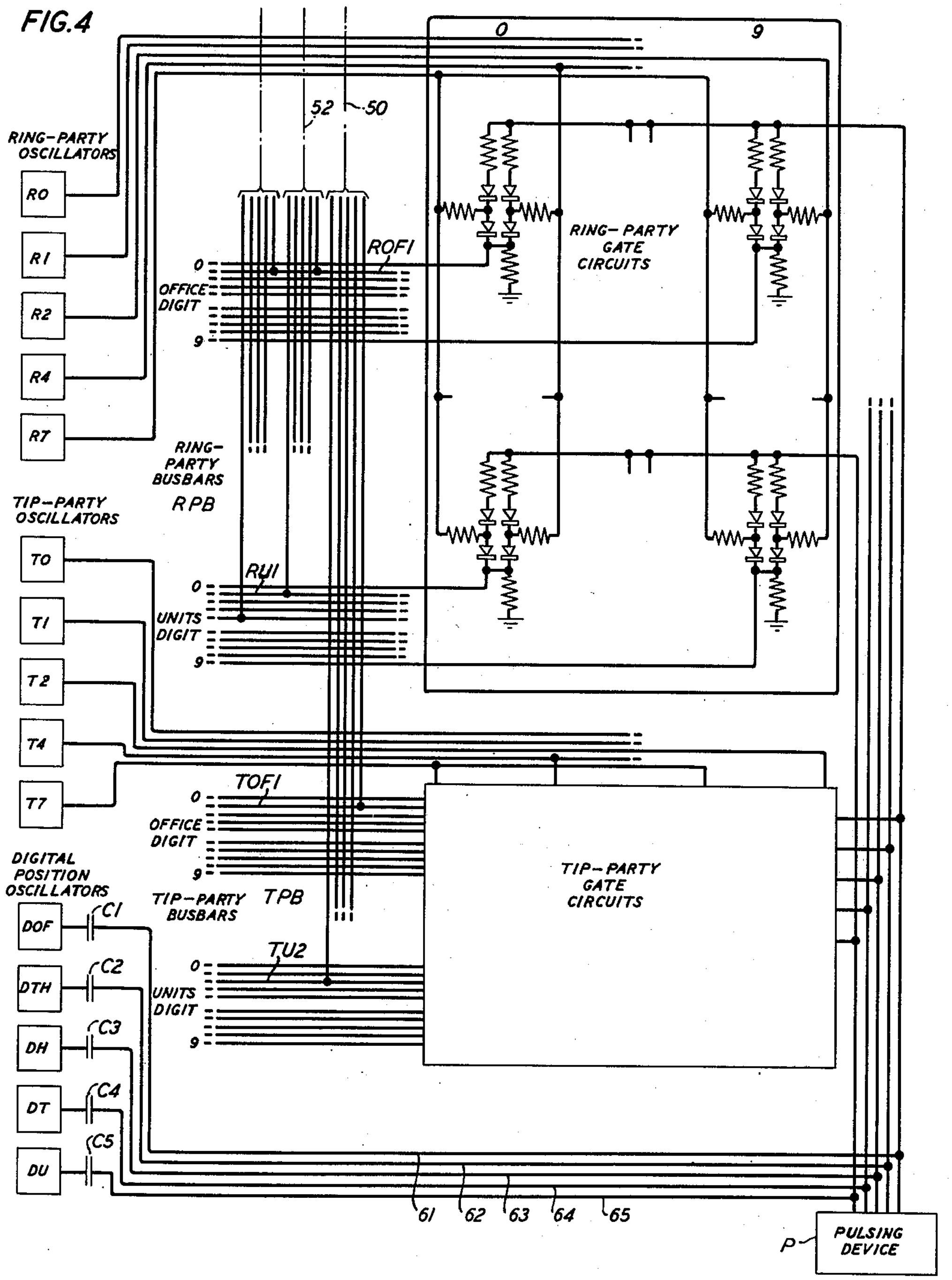
Fig. 4 shows oscillator circuits.

The oscillators, indicated in Fig. 4, are conventional and may be of any suitable type. Oscillators R0 . . . R7 furnish five different frequencies for the numbers of individual stations, ring-party stations and private branch exchange stations; oscillators T0 . . . T7 furnish five other frequencies for the numbers of tip-party stations; while oscillators DOF, DTH, DT, DH, and DU furnish five other frequencies for digital positions, oscillator DOF furnishing a frequency assigned to the first or office digit of directory numbers, oscillator DTH furnishing a frequency assigned to the second or thousands digit of directory numbers, etc. The frequencies from the oscillators are combined in rectifier-resistor gate circuits, some of which are shown in Fig. 4, and supplied to two similar sets of bus bars to which the gate circuits are severally connected, one set (bus bars RPB) for individual stations, ring-party station and private branch exchange numbers, and the other set (bus bars TPB) for tip-party station numbers. In each set there are ten bus bars for each digital position, each bus bar receiving two frequencies representing a particular digit and one frequency representing a particular digital position.

The frequencies R0 . . . R7 and the frequencies T0 . . . T7 may be severally combined in any order or code to represent digits. In the present embodiment of the invention, the following code is used for the digits of ring-party numbers:

| Digit | Frequencies from Oscillators |
|---|---|
| 1 | R0, R1 |
| 2 | R0, R2 |
| 3 | R1, R2 |
| 4 | R0, R4 |
| 5 | R1, R4 |
| 6 | R2, R4 |
| 7 | R0, R7 |
| 8 | R1, R7 |
| 9 | R2, R7 |
| 0 | R4, R7 |

A similar code is used for the digits of tip-party station numbers, employing the frequencies from oscillators T0 . . . T7 instead of those from oscillators R0 . . . R7.

The combinations of frequencies do not reach the bus bars continuously, but only whenever the gate circuits are rendered conducting by pulses from the pulsing device P, which supplies repeated positive pulses on each of the five conductors 61 . . . 65, the pulses on no two of said conductors being simultaneous. It will be observed that conductors 61 . . . 65 are the conductors by which the frequencies from oscillators DOF . . . DU are carried, through capacitors C1 . . . C5, respectively, to the gate circuits. Each pulse from the pulsing device P, therefore, causes all the gate circuits supplied with frequency by a particular one of the oscillators DOF . . . DU to pass frequencies simultaneously, and successive pulses cause gate circuits supplied by the different oscillators to pass frequencies successively. Each bus bar thereby repeatedly receives but one set of three frequencies, two frequencies representing a digit and one frequency representing a digital position, while all the bus bars for the same digital position in both the ring-party and the tip-party groups receive frequencies simultaneously. It will be apparent therefore that at any time frequencies corresponding to a given digit will be present only on the bus bar group corresponding to that digit, together with the frequency identifying the digital position thereof.

The pulsing device P may be of any suitable form, one suitable electrical form being that shown and described in the copending application of J. W. Dehn and W. H. T. Holden, Serial No. 670,358, filed May 17, 1946, now Patent No. 2,486,612, granted October 11, 1949.

The sleeve conductor of each line, in connection with which determination of a directory number may be required, is connected to one element of a diode gas tube, the other element of which is connected to the bus bars in accordance with the directory number of a station on said line, or the directory number of the private branch exchange of which the station on said line is a part. Since directory numbers are subject to change, it is convenient to provide one gas tube for each possible number, permanently connected to appropriate bus bars, and a number of gas tubes, not connected to bus bars, for use with private branch exchange lines, and to connect the lines to these tubes as required. Thus, one element of tube G2 is connected through the resistors shown, and conductors within bracket 50 are extended to tip-party bus bars TPB, and particularly to bars TOF1, TTH3, TH4, TT1, and TU2 (only the office TOF– and units TU– groups of bus bars being shown). Tube G2, therefore, represents the number "3412" of a tip-party station in office No. 1. Station S2 of line L2 is a tip-party station having that directory number; therefore the sleeve conductor 51 of line L2 is accordingly connected to the other element of tube G2.

Station S3 is a ring-party station on line L2 having the directory number "2431" in the same office 1. The sleeve conductor 51 of line L2 is, therefore, also connected to one element of tube G3, the other element of which is connected through the resistors shown by conductors within bracket 52 to ring-party bus bars RPB, and particularly to bars ROF1, RTH2, RH3, RT4, and RU1 (only bus bars ROF1 and RU1 being shown) which are the bus bars for the ring-party number "1–2341."

The sleeve conductor of line L1 is similarly connected to one element of tube G4, the other element of which is connected through resistors to ring-party bus bars RPB for the number "1–1234," which is the number of the individual station S1 on line L1, said station being connected as a ring-party station.

Figures 1, 7:
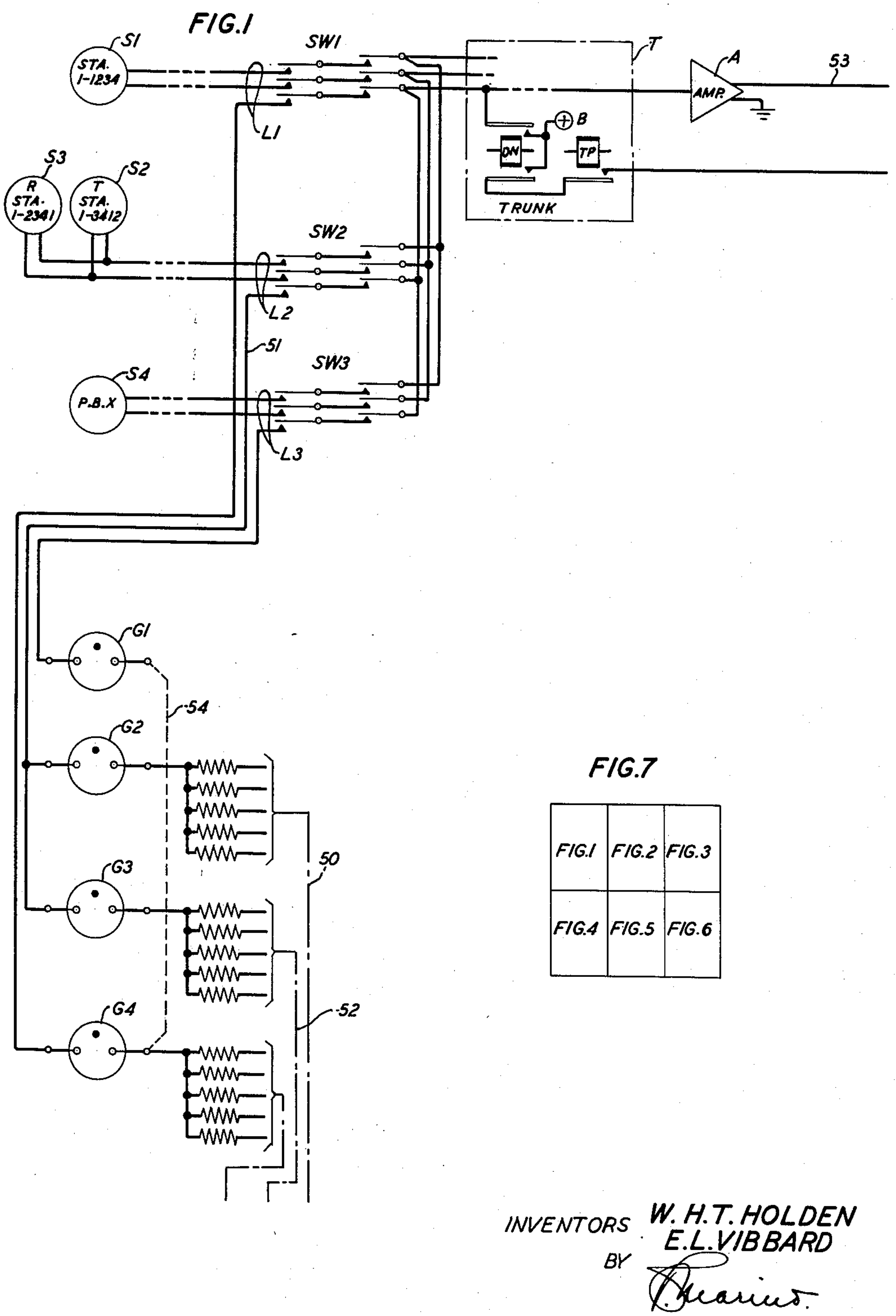
Fig. 1 shows line and trunk circuits.
Fig. 7 shows how Figs. 1–6 should be placed in relation to one another to disclose the invention.

It will be apparent that the various bus bars are all interconnected through the resistor groups of Fig. 1. Consider specifically the case of the 10 "thousands" bus bars TH0 to TH9 (not shown). From each of these bus bars there will be 1000 connections to number points corresponding to tubes G–. And from each point there will be resistors connecting to hundreds, tens and units bus bars, for a 10,000 line group. If there are more than 10,000 lines, there may be 2000 connections, provided the lines do not exceed 20,000, and 3000 if these are not over 30,000 etc. Cross talk or cross fire between bus bars, however, is made negligible by the selective magnitude of the resistors used. Assume, for example, that the individual resistors are 1 megohm each, while the resistance between bus bar and ground in the gate circuit has a value of 10 ohms. Furthermore, let it be assumed that the voltage across the 10 ohm resistor is 10 volts. From a bus bar TH to an individual number point there will be 1 megohm, while from said number point to four other bus bars there will be a total resistance of 250,002.5 ohms. As the other digit bus bars carry no voltage when the thousands bus bars are activated, the voltage delivered to the number point will be 2 volts. And the voltage impressed on a hundred's bus bar, which will appear at 100 number points in common with the thousands' bus bar being considered, will be 0.1 volt. The unwanted or cross fire signals due to the interconnections present between bus bars will be attenuated 26 db in passing from a bus bar to some other bus bar, and a further 12 db in passing from the disturbed bus bar to another number point, or 38 db in all. We thus are able to maintain a satisfactory freedom from interference between the several bus bars by this choice of the bus bar ground impedance at a very low value in comparison with the values of the signal-combining resistors at any number point.

Nevertheless, we regard it as undesirable to allow these signals to stand constantly on the sleeves of the link circuits. This is prevented by the interposition of the glow discharge diodes G–. These diodes could be omitted if standing signals were permitted, but at great increase in the hazard of interference between sleeve conductors, as these circuits, being unbalanced to ground, are subject to cross talk between each other, and the margins between signals and cross talk at the detecting circuits might be reduced dangerously.

Station S4 on line L3 is a station of the private branch exchange of which station S1 is also a part, but neither station S4 nor line L3 is assigned a directory number, the latter being that of station S1 which, for the purpose of illustration, may be assumed to be that station of the private branch exchange group to which the private branch exchange directory number "1–1234" is assigned. This line (line L3) is, therefore, connected to one element of tube G1, the other element of which is not normally connected to bus bars, but connected to tube G4 by the cross-connecting wire 54 so that, with respect to the bus bars, line L3 is, in effect, connected in the same way as line L. Tube G4 may, of course, be connected to bus bars in accordance with some other number, if it is desired to associate station S4 with another directory number.

The frequencies from the oscillators R0 . . . R7 extend to the bus bars RPB over the interconnection between said oscillators and said bus bars established by the ring-party gate circuits, as shown by the typical gate circuits of the "Gate Circuits" in Fig. 4; similarly the frequencies from the oscillators T0 . . . T7 extend to the bus bars TPB over the interconnection between said oscillators and said bus bars established by the tip-party gate circuits, while frequencies from the oscillators DOF . . . DU extend to all bus bars over conductors 61 . . . 65, as before described. All these frequencies, however, do not normally reach the lines because the potentials thereof are insufficient to break down the gap of any of the tubes G1, G2, etc., but if the gap of any of said tubes is broken down, then frequencies from the bus bars reach the line to which said tube is connected through the conductive gap of said tube.

Figure 2:
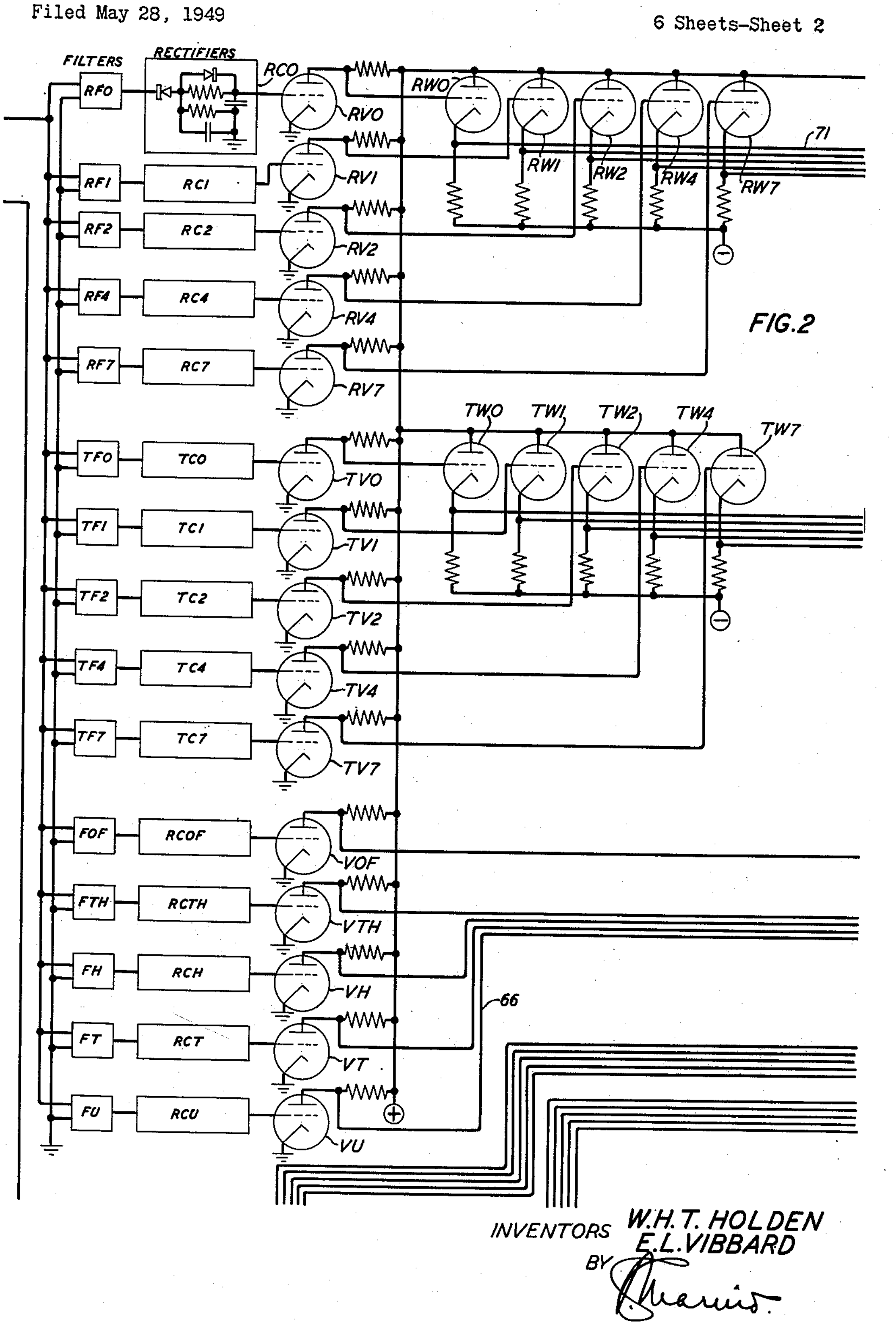
Figs. 2 and 3 show receiving equipment.
Figure 3:
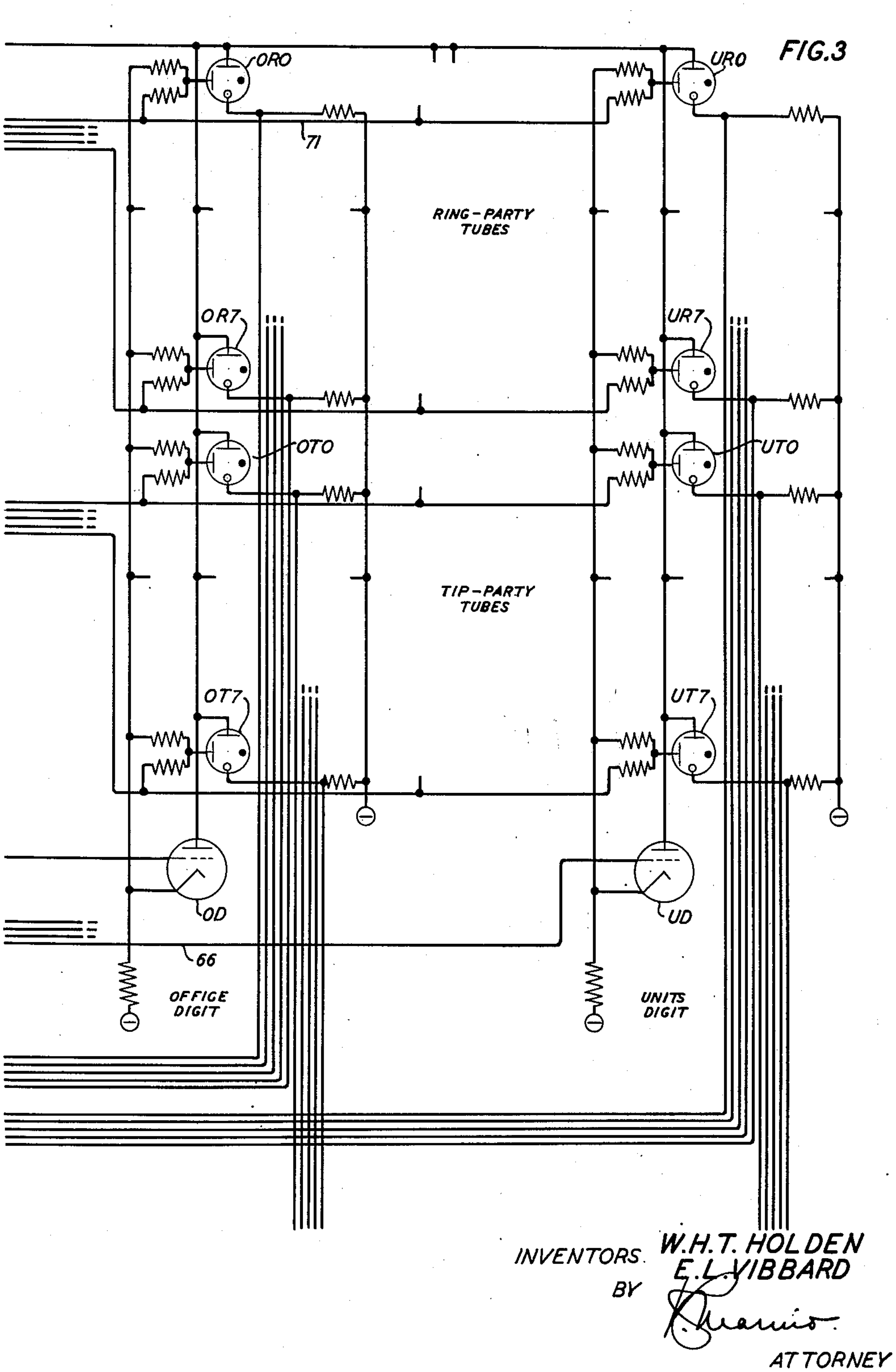

To the trunks or other elements to which calling lines are extended in establishing telephone connections, the receiving equipment, shown in Figs. 2 and 3, is connected. This equipment comprises fifteen frequency-responsive circuits of conventional form, each responsive to one only of the frequencies severally produced by the oscillators shown in Fig. 4, and two sets of gas tubes, the set OR0 . . . UR7 for ring-party and private branch exchange numbers and the set OT0 . . . UT7 for tip-party numbers. Each set of gas tubes is provided with a checking circuit, the checking circuit for the ring-party tubes OR0 . . . UR7 being shown in Fig. 5 and the checking circuit for the tip-party tubes OT0 . . . UT7 being shown in Fig. 6, the two checking circuits being alike. The register RR, of any suitable kind, being arranged to be responsive to ring-party gas tubes which conduct, and a similar register TR being similarly arranged with respect to the tip-party tubes.

Assuming, now, that line L2 has been extended to trunk T by the operation of switches SW2 in the usual manner in response to a call from station S3, and it is desired to determine and register the directory number of the station calling. Relay DN in the trunk is operated by any suitable means. Relay TP is the usual party-test relay of the trunk, which is operated in the usual manner if the calling station is a tip-party station but which is not operated when the calling station is not a tip-party station. Patent No. 1,513,351 granted October 28, 1924 to D. M. Taggart et al. shows this arrangement and reference to this patent is made for a complete description of the party test circuit the operation of which results in the operation or non-operation of relay TP. Station S3, now calling, is a ring-party station and relay TP is, therefore, not operated. When relay DN operates, booster battery B of sufficient potential to break down the gap of any of the gas tubes G1, G2, etc. is connected through the upper contacts of relay DN, lower contacts of switches SW2, and conductor 51, gas tubes G2 and G3, the five resistors connected to the anode of each of said tubes, through the associated bus bars via conductor groups 52 and 50 in bus bar groups RPB and TPB, respectively, to which said resistors are connected as previously described, to ground through the lower left of a gate circuit connected to each of said bus bars, as shown in Fig. 4. The gaps of tubes G2 and G3 are ionized over the above-traced circuits. Frequencies from the bus bars then reach conductor 51 through both of said tubes, are transmitted back over the path traced above to the lower contacts of switch SW2 and thence to amplifier A, of conventional form, are amplified therein, and are transmitted over conductor 53 to all of the frequency-responsive circuits of the receiving equipment shown in Fig. 2.

When relay DN operates, the frequencies which are first transmitted to the receiving equipment may be the frequencies for any digital position depending upon the time when relay DN operates. Assuming that they are the frequencies for the fifth digital position (units digit), said frequencies come from bus bars RU1 and TU2, since these are the bus bars for the fifth digital position connected to tubes G2 and G3, respectively. Each of these bus bars transmits the frequency from oscillator DU to which filter FU alone is responsive. This frequency is transmitted by filter FU, is rectified by rectifier RCU, and the resultant negative potential is applied to the control grid of tube VU. This tube normally conducts over an obvious circuit, but now ceases to conduct due to the negative potential on its control grid. The resultant more positive potential of its anode is transmitted over conductor 66 to the control grid of cathode-follower tube UD, which normally conducts over an obvious circuit. The cathode of the latter tube and the starter elements of all the gas tubes UR0 . . . UR7 and UT0 . . . UT7 connected thereto, which are normally negative, thereby become more positive, but not sufficiently so to cause any of said gas tubes to conduct.

Other filters are responsive to other frequencies transmitted from bus bars RU1 and TU2 and transmit said frequencies with effects similar to those described above. For example, frequency from oscillator R0 transmitted from bus bar RU1 passes through filter RF0, is rectified in rectifier RC0, and arrests conduction in the normally-conducting tube RV0, which causes the cathode of the cathode-follower tube RW0 to become more positive. The resulting positive potential of said cathode is transmitted over conductor 71 to the starter elements of all the gas tubes OR0 . . . UR0, but is not sufficient to overcome the negative bias on any of said starter elements, except that of tube UR0 where the negative bias has been reduced, as described above. The starter element of tube UR0 alone of the tubes OR0 . . . UR0 becomes sufficiently positive to cause said tube to conduct. Similarly, others of the tubes UR0 . . . UR7 and UT0 . . . UT7 similarly affected conduct. It is evident that those of tubes UR0 . . . UR7 which conduct, indicate or register, in the code given above, the units digit "1" of the directory number of ring-party station S3, while those of tubes UT0 . . . UT7 which conduct similarly indicate or register the units digit "2" of the directory number of tip-party station S2.

When the frequencies from bus bars RU1 and TU2 cease, the circuits are restored to normal, except the conducting gas tubes of Fig. 3, which continue to conduct. The next frequencies transmitted are those for the first or office digit, followed by those for the thousands, hundreds, and tens digits, respectively. Each group of frequencies causes the conduction of corresponding gas tubes of Fig. 3 in the manner described above, the total gas tubes conducting showing the entire directory numbers of stations S2 and S3. Relay DN may then be released, but this may be done at any time thereafter, since further transmission of frequencies to the receiving equipment can cause no change in the gas tubes conducting therein.

Figure 5:
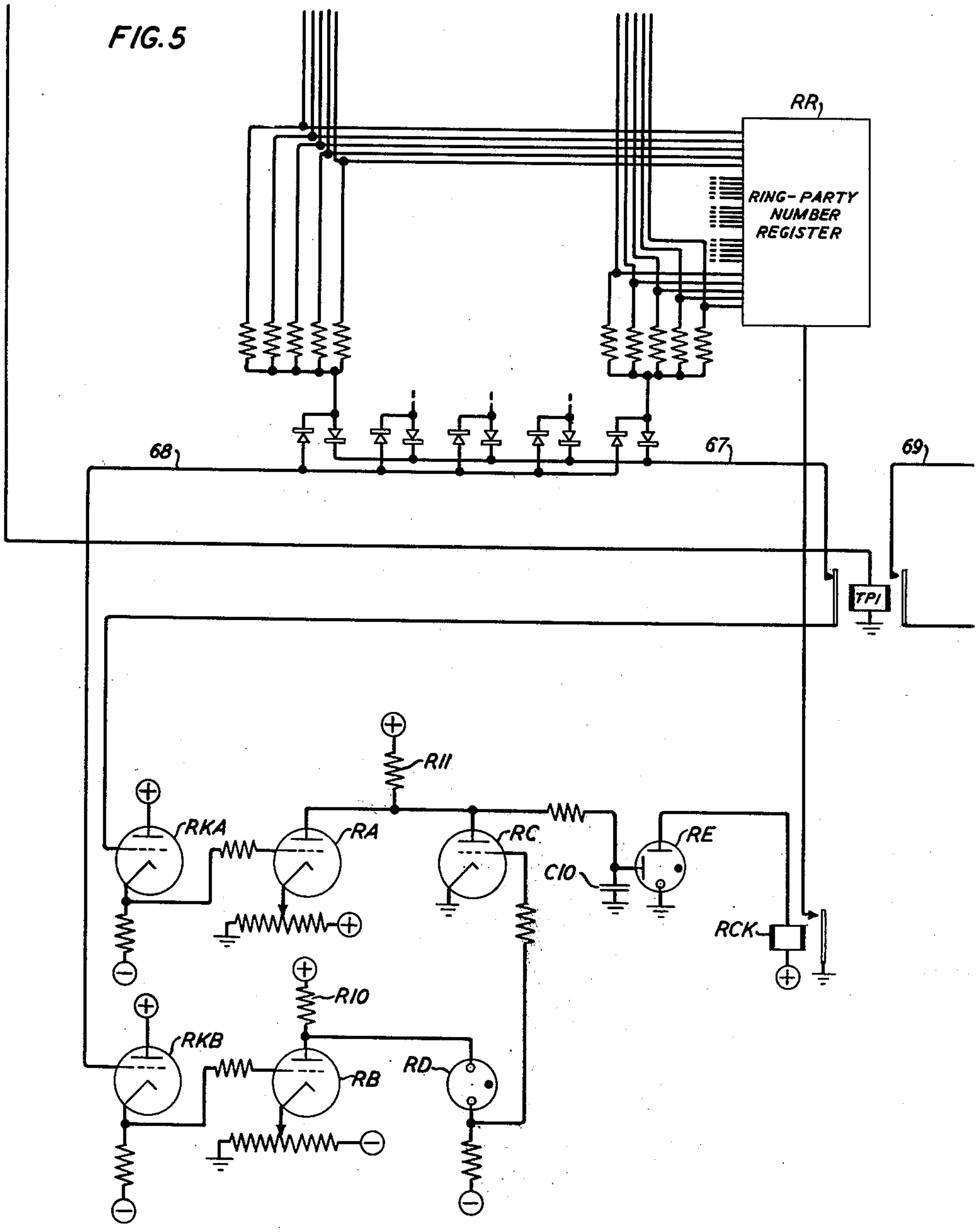
Figs. 5 and 6 show checking circuits, and also indicates registers.
Figure 6:
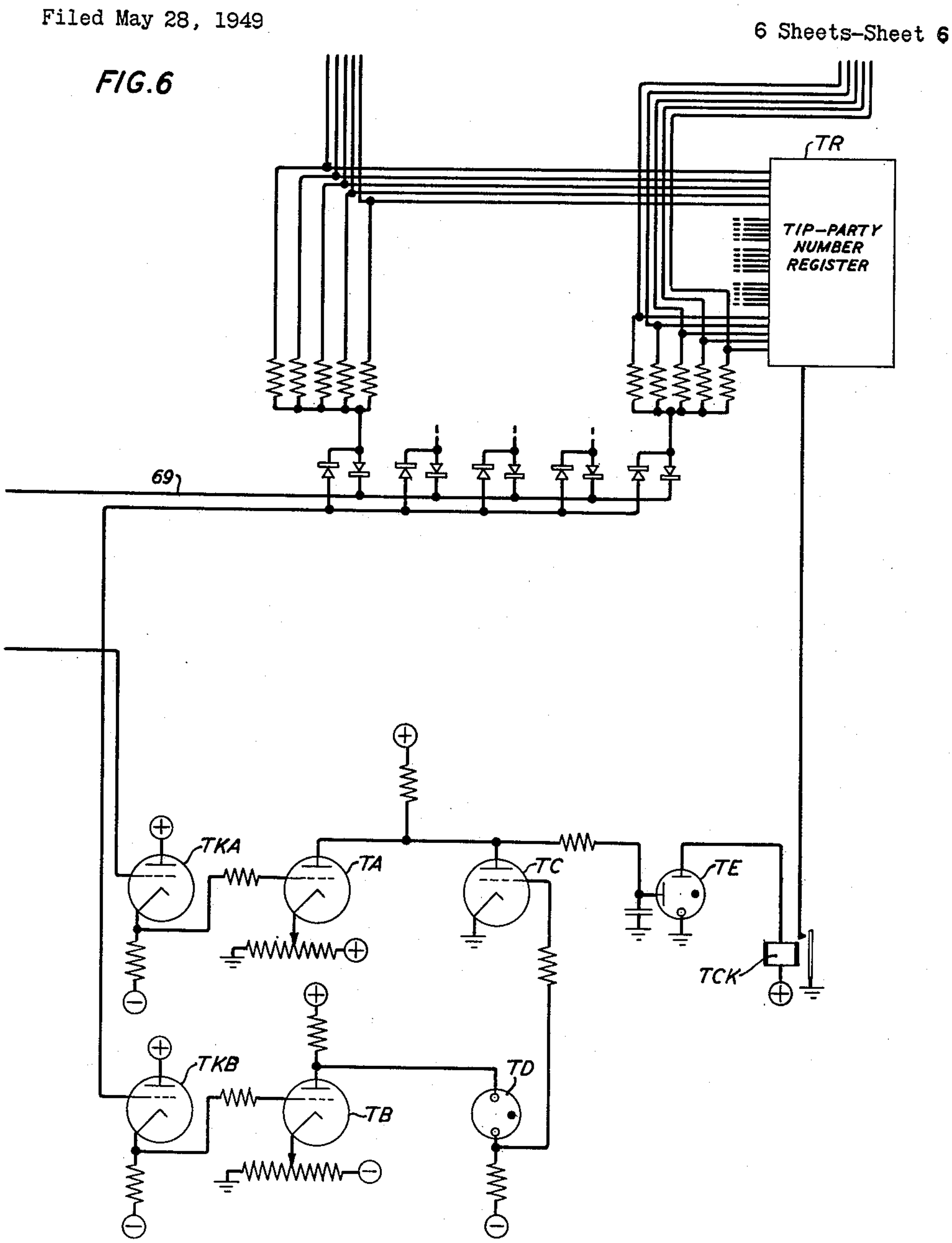

The cathodes of the gas tubes of the part of the receiving equipment shown in Fig. 3 are connected to the checking circuits through resistors and rectifiers as shown in Figs. 5 and 6. The two checking circuits are similar and a description of one of them will serve for both.

It will be observed that the cathodes of the gas tubes OR0 . . . UR7 and OT0 . . . UT7 of the receiving equipment are connected to the rectifiers in groups of five tubes, each group being the tubes for one digital position. When a directory number has been received, two of the above tubes in each group should be conducting. The cathodes of non-conducting tubes are negative and the cathodes of conducting tubes are positive. With the same number of tubes conducting in each group, the potentials on conductors 67 and 68 are the same, and with two tubes conducting in each group, these potentials are negative. Tubes RKA and RKB are cathode followers which merely repeat, at their cathodes, potentials applied to their control grids. These tubes are not essential but are provided to maintain constant impedances at conductors 67 and 68, since the control grids of tubes RA and RB may, at times, draw current. The potentials at the cathodes of tubes RA and RB are adjusted, by means of the voltage dividers shown connected to said cathodes, so that tube RA does not conduct when the potential of its control grid is that which exists on conductors 67 and 68 when two gas tubes of each group in the receiving equipment are conducting, as described above, or a more negative potential, but does conduct at more positive potentials on its control grid, while tube RB conducts when the same potential or a more positive potential is applied to its control grid, but does not conduct when a more negative potential is so applied.

With the potential of conductor 67 applied to the control grid of tube RA by the cathode follower tube RKA, and the potential of conductor 68 applied to the control grid of tube RB by the cathode follower tube RKB, tube RA does not conduct and tube RB does conduct when two gas tubes in each group of the receiving equipment are conducting. If more than two gas tubes of each group conduct, the potentials on conductors 67 and 68 are still equal, but more positive. Both of tubes RA and RB then conduct. If less than two gas tubes in each group conduct, the potentials on conductors 67 and 68 are still equal but more negative than with two gas tubes in each group conducting. Neither of tubes RA and RB then conducts. If one number of gas tubes conducts in some of the groups to which the checking circuit of Fig. 5 is responsive, and a different number conducts in others of those groups, the potentials on conductors 67 and 68 are not equal. Then both tubes RA and RB conduct, or neither conduct, or tube RA conducts and tube RB does not conduct.

Only when exactly two gas tubes in each group of the receiving circuit to which tubes RA and RB are responsive conduct, will tube RA not conduct and tube RB conduct. Under these circumstances, the diode gas tube RD, which normally conducts, is cut off, due to the potential drop in resistor R10. Its cathode and the control grid of tube RC, which normally conducts, thereby become more negative, and tube RC is cut off. The resultant rise of potential at the anode of the latter tube, transmitted to the starter element of the triode gas tube RE, causes tube RE, which does not normally conduct, to conduct, after a delay due to the charging time of capacitor C10, operating relay RCK.

If, however, tube RA conducts, the potential at its anode and, therefore, at the starter element of tube RE, is so lowered by the potential drop in resistor R11 that tube RE will not conduct and relay RCK will not operate. Or, if tube RB does not conduct, tube RD continues to conduct and tube RC, if conducting, is not cut off, so that tube RE does not conduct and relay RCK does not operate.

Thus, when two gas tubes in each group of the receiving equipment conduct, as described above, in response to a call from station S3, relay RCK operates, supplying operating ground, through its contacts, to register RR, which thereupon registers the ring-party directory number indicated by the conducting gas tubes of the receiving equipment, which is the directory numbers of station S3. But since relay TP1 is not operated to complete the circuit of relay TR1, conductor 69 is not connected to tube TKA, said tube TA conducts and prevents the operation of relay TCK. No operating ground is, therefore, provided for register TR and the indicated tip-party directory number is not registered therein.

In the case of a call from station S2, the operation is similar to that described above but, station S2 being a tip-party station, relay TP of the trunk is operated and relay TP1 operates over an obvious circuit when relay DN operates. Conductor 67 is then disconnected from tube RKA by the left-hand contacts of relay TP1, and conductor 69 is connected to tube TKA by the right-hand contacts of relay TP1. The checking circuit for register RR is then inoperative and the checking circuit for register TR then operates in the manner described above for the checking circuit of register RR. The indicated tip-party directory number, which is the directory number of station S2, is, therefore, registered by register TR, and the indicated ring-party directory number is not registered by register RR. Of course, as described above, if an improper number of the gas tubes of the receiving equipment, for the number to be registered, conduct, the associated checking circuit does not respond and no number is registered by register RR or register TR. Relays RCK and TCK may be arranged to also control timing, recycling, and alarm circuits, if desired.

It will be evident without further description that on a call from station S1, frequencies for a ring-party number, which is the directory number of station S1, will be transmitted and, relay TP1 not being operated, this number will be registered by register RR, if correctly indicated by the receiving equipment. Also, it will be evident that, on a call from station S4, the operation will be the same as on a call from station S1 and the same directory number will be registered.

For simplicity, only one trunk and a set of receiving equipment connected thereto have been shown, and means of restoring the receiving equipment and registers, when operated, have not been shown. It will be understood that, in practice, a plurality of trunks would be used and well-known means provided for connecting the receiving equipment to each trunk as required and for restoring the equipment to normal after operation. The arrangement and numbering of the stations is also, of course, illustrative, and it will be evident that the invention is adapted to other specific arrangements than the ones shown.

The terms and expressions which we have used in reference to our invention are used as terms of description and not of limitation. We have no intention in the use of such terms and expressions of thereby excluding equivalents or modifications of the features shown and described, or parts of them, but, on the contrary, intend to include therein any and all equivalents and modifications that may be employed without departing from the spirit of the invention.

What is claimed is:

1. A station identification system comprising in combination a line with a station thereon having an identifying designation composed of digits, sources of different frequencies, means for applying successive combinations of said frequencies to said line when placed in a calling condition by a call originated at said station, each of said combinations of frequencies being indicative of a digit of said designation and of the digital position of said digit in said designation, and means responsive to the frequencies applied to said line for registering all of the digits of said designation in their digital order.

2. A station identification system comprising in combination a line having a plurality of stations thereon, each of said stations having an identifying designation composed of digits, sources of different frequencies, means for applying successive combinations of said frequencies to said line when placed in a calling condition by a call originated at one of said stations, each of said combinations of frequencies being indicative of the digits having the same digital position in the designations of said stations and indicative of said digital position, and means responsive to the frequencies applied to said line for registering all of the digits of the designation of said calling station in their digital order.

3. A station identification system comprising in combination a line with a station thereon having an identifying designation composed of digits, sources of different frequencies, means for applying successive combinations of said frequencies to said line when placed in a calling condition by a call originated at said station, each of said combinations of frequencies being indicative of a digit of said designation and of the digital position of said digit in said designation, and means each individually responsive to one of said combinations for registering all of the digits of said designation in their digital order.

4. A station identification system comprising in combination a line having a plurality of stations thereon, each having an identifying designation composed of digits, sources of different frequencies, means for applying successive combinations of said frequencies to said line when placed in a calling condition by a call originated at one of said stations, each of said combinations of frequencies being indicative of the digits having the same digital position in said designations and indicative of said digital position, and means each individually responsive to one of said combinations for registering all of the digits of the designation of said calling station in their digital order.

5. A station identification system comprising in combination a line with a station thereon having an identifying designation composed of digits, sources of different frequencies, means for applying successive combinations of said frequencies to said line when placed in a calling condition by a call originated at said station, each of said combinations being composed of frequencies indicative of one of the digits of said designation and a frequency indicative of the digital position of said digit in said designation, means responsive to the frequencies on said line for indicating the number of frequencies indicative of digits in each of said combinations, and means responsive to the indication by said indicating means of a predetermined number of frequencies in each of said combinations for registering all of the digits of said designation in their digital order.

6. A station identification system comprising in combination a line having a plurality of stations thereon each having an identifying designation composed of digits, sources of different frequencies, means for applying successive combinations of said frequencies to said line when placed in a calling condition by a call originated at one of said stations, each of said combinations being composed of frequencies indicative of the digits having the same digital position in said designations and a frequency indicative of the identical position of said digits in said designations, means for determining the calling one of said plurality of stations, means responsive to the digit-designating frequencies applied to said line, and means controlled by said calling station determining means and responsive to said last-mentioned means when responding to a predetermined number of frequencies in each of said combinations of frequencies for the digits of the designation of said calling station for registering all of the digits of the designation of said calling station in their digital order.

7. A station identification system comprising in combination a first line having a station thereon provided with an identifying designation composed of digits, a second line having a station thereon, sources of different frequencies, means responsive to a calling condition on said second line for applying to said line successive combinations of said frequencies, each of said combinations being indicative of a digit of the designation of the station on said first line and indicative of the digital position of said digit, and means responsive to the frequencies applied to said line for registering all of the digits of the designation of the station on said first line in their digital order.

8. A station identification system comprising in combination a line with a station thereon having an identifying designation composed of digits, sources of different frequencies, means for applying successive combinations of said frequencies to said line when placed in a calling condition by a call originated at said station, each of said combinations of frequencies being indicative of a digit of said designation and of the digital position of said digit in said designation, means responsive to the frequencies applied to said line, and means responsive to the operation of said last-mentioned means for registering all of the digits of said designation in their digital order.

9. A station identification system comprising in combination a line having a plurality of stations thereon, each of said stations having an identifying designation composed of digits, sources of different frequencies, means for applying successive combinations of said frequencies to said line when placed in a calling condition by a call originated at one of said stations, each of said combinations of frequencies being indicative of the digits having the same digital position in the designations of said stations and indicative of said digital position, means responsive to the frequencies applied to said line, and means responsive to the operation of said last-mentioned means for registering all of the digits of the designation of said calling station in their digital order.

10. A station identification system comprising in combination a line with a station thereon having an identifying designation composed of digits, sources of different frequencies, means for applying successive combinations of frequencies to said line when placed in a calling condition by a call originated at said station, each of said combinations of frequencies being indicative of a digit of said designation and of the digital position of said digit in said designation, means each individually responsive to one of said combinations, and means responsive to the operation of said last-mentioned means for registering all of the digits of said designation in their digital order.

11. A station identification system comprising in combination a line having a plurality of stations thereon, each having an identifying designation composed of digits, sources of different frequencies, means for applying successive combinations of said frequencies to said line when placed in a calling condition by a call originated at one of said stations, each of said combinations of frequencies being indicative of the digits having the same digital position in said designations and indicative of said digital positon, means each individually responsive to one of said combinations, and means responsive to the operation of said last-mentioned means for registering all of the digits of the designation of said calling station in their digital order.

12. A station identification system comprising in combination a line with a station thereon having an identifying designation composed of digits, sources of different frequencies, means for applying successive combinations of frequencies to said line when placed in a calling condition by a call originated at said station, each of said combinations being composed of frequencies indicative of one of the digits of said designation and a frequency indicative of the digital position of said digit in said designation, means responsive to the frequencies on said line for indicating the number of frequencies indicative of digits in each of said combinations, means responsive to the indication by said indicating means of a predetermined number of frequencies in each of said combinations, and means responsive to the operation of said last-mentioned means for registering all of the digits of said designation in their digital order.

13. A station identification system comprising in combination a first line having a station thereon provided with an identifying designation composed of digits, a second line having a station thereon, sources of different frequencies, means responsive to a calling condition on said second line for applying to said line successive combinations of said frequencies, each of said combinations being indicative of a digit of the designation of the station on said first line and indicative of the digital position of said digit, means responsive to the frequencies applied to said line, and means responsive to the operation of said last-mentioned means for registering all of the digits of the designation of the station on said first line in their digital order.

14. A station identification system comprising in combination a line having a plurality of stations thereon each having an identifying designation composed of digits, sources of different frequencies, means for applying successive combinations of said frequencies to said line when placed in a calling condition by a call originated at one of said stations, each of said combinations being composed of frequencies indicative of the digits having the same digital position in said designations and a frequency indicative of the identical position of said digits in said designations, means for determining the calling one of said plurality of station, means responsive to the digit-designating frequencies applied to said line, means responsive to said frequency responding means when responding to a predetermined number of frequencies in each of said combinations of frequencies for the digits of the designation of said calling station, and means controlled by said calling station determining means and responsive to said last-mentioned means for registering all of the digits of the designation of said calling station in their digital order.

WILLIAM H. T. HOLDEN.
EDWARD L. VIBBARD.

References Cited in the file of this patent

UNITED STATES PATENTS

| Number | Name | Date |
|---|---|---|
| 2,206,538 | Rhodes | July 2, 1940 |
| 2,244,500 | Nyquist | June 3, 1941 |
| 2,387,897 | Grandstaff | Oct. 10, 1945 |